United States Patent [19]
Deblay

[11] Patent Number: 5,382,365
[45] Date of Patent: Jan. 17, 1995

[54] PROCESS FOR AT LEAST PARTIAL DEHYDRATION OF AN AQUEOUS COMPOSITION AND DEVICES FOR IMPLEMENTING THE PROCESS

[75] Inventor: Philippe Deblay, Chatenay-Malabry, France

[73] Assignee: Cogia, France

[21] Appl. No.: 964,220

[22] Filed: Oct. 21, 1992

[30] Foreign Application Priority Data

Oct. 22, 1991 [FR] France .................................. 9113013

[51] Int. Cl.$^6$ ............................................. B01D 61/24
[52] U.S. Cl. .................................. 210/644; 210/321.72
[58] Field of Search ............... 210/650, 638, 644, 648, 210/321.72

[56] References Cited

U.S. PATENT DOCUMENTS

| | | | |
|---|---|---|---|
| 4,781,837 | 11/1988 | Lefebvre | 210/640 |
| 4,846,477 | 7/1989 | DeVellis et al. | 210/644 X |
| 4,933,198 | 6/1990 | Lee et al. | 210/640 X |
| 5,098,566 | 3/1992 | Lefebvre | 210/640 |

*Primary Examiner*—Frank Spear
*Attorney, Agent, or Firm*—Blakely, Sokoloff, Taylor & Zafman

[57] ABSTRACT

The present invention relates to a process for at least partial dehydration of an aqueous composition, in which said composition to be dehydrated is brought into contact, through the intermediacy of a microporous hydrophobic membrane, with a receiving phase whose water activity is substantially lower than that of the aqueous composition and in which the aqueous composition, at least partially dehydrated, is recovered. The invention also relates to devices enabling the process to be implemented, especially continuously.

13 Claims, 3 Drawing Sheets

FIG_1

FIG_3

FIG_2

PROCESS FOR AT LEAST PARTIAL DEHYDRATION OF AN AQUEOUS COMPOSITION AND DEVICES FOR IMPLEMENTING THE PROCESS

SUMMARY OF THE INVENTION

The present invention relates to a process for at least partial dehydration of an aqueous composition. It also relates to devices for implementing said dehydration process.

The operations of concentration by dehydration, which are necessary in the manufacture of many commodity products are encountered chiefly in the agrifoodstuffs and biotechnology industries.

The increase in the solids content is conventionally obtained by removal of the solvent (generally water) by a thermal route, for example evaporation, or by a physical route, for example by employing the reverse osmosis or ultrafiltration techniques.

In the biotechnology sector, for example, the conventional membrane processes such as reverse osmosis and ultrafiltration are particularly advantageous for the concentration of sensitive solutes, especially during the preparation of enzymes, nucleic acids or vaccines.

These processes make it possible, in fact, to minimize the losses in activity due to the effect of temperature, in contrast to evaporation or distillation, and to maintain the structures and consequently the biological activity.

However, these processes exhibit a certain number of disadvantages, the greatest of these being the lack of selectivity in relation to the solutes of low molecular weight.

The cutoff threshold corresponding to the smallest molecular mass retained by the membrane is, in fact, of the order of 200 in the case of reverse osmosis, and an order of higher magnitude in the case of ultrafiltration (Delaunay et al. Revue générale du froid II, 622–626 (1979)). Under these conditions, small molecules, such as sugars, amino acids and salts, pass through the membrane, at least partially, with the aqueous solvent.

A gradual accumulation of the molecules detained along the membrane under the effect of pressure is also observed in these processes; this is the concentration polarization phenomenon as described by Maurel, Techniques de l'Ingénieur, chimie-génie chimique [Engineering Techniques, chemistry-chemical engineering], volume II, J2790/1-J2795/6 (1989). This results in a decrease in the plant performance, in terms of solvent flow and rejection rate. In addition, the concentration operation cannot be quantitative because of the losses by deposition.

It can be assumed, finally, that under the effect of the pressure applied (up to 60 bars in the case of reverse osmosis) some particularly sensitive solutes or constituents are wholly or partially degraded.

In the agricultural and food industries the concentration of products offers a twofold advantage: it makes it possible, in fact, to extend the lifetime of these goods by reduction in chemical, enzymatic and microbiological deterioration and to reduce the storage and transport costs. In particular, in tropical countries, the preservation of water-rich food products such as vegetables (from 70 to 90% of water) is a crucial problem. The development of microorganisms in food is, in fact, directly related to the water activity (written as wa). The term water activity denotes the ratio of the vapor pressure of the water in the food (liquid or solid) to the vapor pressure of pure water at the same temperature. The development of microorganisms is proportionally greater the closer wa is to 1. They do not reproduce when it is lower than 0.6 (Botton et al.; collection biotechnologies [Biotechnology Series], Masson, Paris 232–233 (1985)). The preservation of foodstuffs therefore requires them to undergo a treatment resulting in a decrease in their water content.

Among the envisaged treatments, osmotic dehydration through a hydrophilic semipermeable membrane has been employed since 1938 for the concentration of liquid foods of a high water content, such as fruit juices, as described in U.S. Pat. No. 2,116,920. The process is based on the principle of osmosis: a semipermeable membrane separates the liquid to be concentrated from a solution which has a higher osmotic pressure. Water diffuses through the membrane from the less concentrated solution towards the more concentrated solution. This water transport therefore relies on an osmotic pressure gradient or, in other words, water activity, these two quantities being linked by the relationship: $a_w = e^{-(\pi V/RT)}$.

Historically, the first device employed for concentrating fruit Juices consisted of a cellophane membrane and of a sugar syrup or a solution of calcium chloride as water-receiving phase (U.S. Pat. No. 2,116,920). The main advantage of this process consists in carrying out the concentration at room temperature, or even at lower temperature. The major disadvantage corresponds to a nonselective water transport, the concentration of orange juice having, for example, shown the diffusion of citric acid through the cellophane membrane.

Osmotic dehydration of "solid" foods has also been envisaged since 1947 (U.S. Pat. No. 2,420,517). The process consists in immersing the food product in a solution of a hydrophilic organic product which has a water activity lower than that of the foodstuff. This solute constituent of the receiving phase must be highly soluble in water, hygroscopic, nontoxic, inert toward the flavor, odor and color of the foodstuff, and less volatile than water. The most frequently encountered constituents are:

pure products: sodium chloride, sucrose or glycerol,
agricultural raw materials: cane molasses or corn syrup,
mixtures of these compounds: sodium chloride and glycerol or corn syrup and sucrose.

Dehydration of the foodstuff is accompanied by an increase in its content as constituent solute of the receiving phase; when compared with the initial weight of the foodstuff, the water loss is compensated by the gain in solute, as explained by Adambounou et al., Science des aliments, 3, 551–587 (1983).

The main advantage of these processes consists in the ability to rehydrate the solid food product rapidly in order to return to a state closer to the fresh initial state than that of the foodstuff dried in a traditional manner.

Nevertheless, the water flow is accompanied by undesirable diffusion of, on the one hand, water-soluble substances, for example short organic acids and, on the other hand, of sugar or salt which are present in the water-receiving phase; the marked changes in the organoleptic properties which result from this (especially taste and odor) represent the main disadvantage of this process.

The invention is therefore intended especially to improve the processes Just described.

Thus, one of the objectives of the present invention is to propose a process whose selectivity is excellent both for the constituents of the aqueous composition to be dehydrated and of the receiving phase.

Another objective of the present invention is to propose a process whose performance is excellent, the initial water transport flow being of the order of $10^{-2}$ mol/h cm$^2$ and the water extraction being greater than 70% of the initial volume of the solution and even being capable of reaching 95% of the latter.

Another objective of the present invention is to propose a dehydration process capable of being carried out at low temperature, without agitation and without drastic decrease in the water transport flow.

Another objective of the present invention is also to propose devices which are especially adapted to the implementation of the process.

Other advantages and objectives of the present invention will appear in the light of the description which is to follow.

The invention firstly proposes a process for at least partial dehydration of an aqueous composition, in which said composition to be dehydrated is placed in contact, through the intermediacy of a microporous hydrophobic membrane, with a receiving phase whose water activity is substantially lower than that of the aqueous composition and in which the aqueous composition, at least partially dehydrated, is recovered.

Any aqueous compositions intended to be dehydrated can be suitable within the scope of the present invention. This is the case especially with those encountered in the papermaking and textile industries, water treatment and agri-foodstuff and biotechnology industries.

Nevertheless, the process is particularly able for liquid aqueous compositions containing sensitive solutes and usually concentrated by reverse osmosis or ultrafiltration processes. Thus, the process is especially suitable for the concentration of compositions containing enzymes, nucleic acids or vaccines. The process also finds a particularly advantageous use in the case of the concentration of liquid foods of high water content, such as fruit Juices or vegetable juices.

The aqueous compositions may also be solid. Particular mention may be made of cut fruits intended to be dried while retaining their flavor and their various vitamins, various vegetables capable of being presented in a dehydrated form while being optionally capable of being rehydrated later for subsequent consumption. The aqueous compositions may also be gaseous, such as air.

This listing does not, of course, limit the process according to the invention.

The receiving phase may be solid in form (for example $P_2O_5$). It may also be in the form of a gel, especially aqueous. However, in order to ensure good contact between the membrane and the said receiving phase, it has been found that liquid phases were very particularly suitable, and especially those including an aqueous solution of at least one solute making it possible to lower the water activity.

Suitable solutes must be preferably highly soluble in water and hygroscopic. Calcium chloride, magnesium chloride and sodium chloride will be mentioned in particular. Among these, it has been found that it is particularly advantageous to employ calcium chloride. In general, it is advantageous to employ a receiving phase in which the solute concentration is close to saturation.

Thus, in the case of $CaCl_2$, which is the solute that will be most advantageously chosen in the case of the present invention, the concentration will be at least 5M and preferably equal to or higher than 6M.

In the agri-foodstuff industry it is preferable that the receiving phases should be nontoxic and inert towards the flavors, the odor and the color of the foodstuffs. The abovementioned solutes offer these advantages in many cases.

In addition, in order to further increase the selectivity of the process when the aqueous compositions are liquid, it has been found advantageous to employ a receiving phase as described above with its preferred alternate forms, additionally containing one or a number of volatile constituents present in the aqueous composition to be dehydrated. This or these constituent(s) are present in a concentration substantially equal to that existing in the aqueous composition.

According to a highly advantageous alternate form, the process according to the invention is one an which the liquid receiving phase comprises the aqueous solution of a solid enabling the water activity to be lowered and consists of the liquid aqueous solution to be dehydrated and of said solute.

In general, the water transport flow will be proportionally higher the higher the ratio of the water activity of the aqueous composition to be concentrated to the water activity of the receiving phase.

Thus, one of the advantageous features of the present invention lies in the fact that the initial water flow is higher than $5\times10^{-4}$ mol/h cm$^2$ and preferably still higher than $10^{-3}$ mol/h cm$^2$.

While it may be difficult to indicate an upper limit, it is well known that on an industrial scale the said flow is lower than or equal to $10^{-1}$ mol/h cm$^2$. This flow tends to decrease with time because of the decrease in the water activity gradient between the aqueous composition and the receiving phase. This flow will preferably need to remain sufficient during the process in order that at least 70% of the water of the aqueous composition may be transferred in a time which is reasonable from an industrial viewpoint (especially less than 24 hours and preferably less than 10 hours). Gradual addition to the receiving phase of at least one solute lowering the water activity will, for example, maintain a water activity gradient at a high value and thereby maintain an approximately constant flow.

According to another advantageous alternate form, the water activity of the receiving phase will preferably need to be lower than 30% than that of the aqueous composition, advantageously approximately 50% lower and very advantageously at least approximately 60% lower.

In general, the receiving phase will exhibit a water activity at least lower than 0.6, preferably lower than 0.4 and very advantageously lower than approximately 0.3 when the aqueous composition exhibits a water activity approximately higher than 0.9.

Thus, in the case of the products conventionally encountered in the biotechnology industries: a sugar (glucose), amino acids (tryptophan and glutamic acid), a vitamin (vitamin B12), an enzyme (alpha-amylase) and a bioactive peptide (kyotorphin) the water activity is generally close to 1, on account of the fact that the solutes present are generally relatively low in concentration. Among the solid foodstuffs, fresh products in general and fruit in particular have a water content higher than 0.98. The water activity of fruit juices is also quite high, generally between 0.9 and 1. In order to obtain a maximum efficiency, in the abovementioned cases the receiving phase will need to have a water activity lower than approximately 0.6, preferably lower than 0.4 and very advantageously lower than approximately 0.3.

The temperature at which the process must be performed is generally higher than 0° C. and must be lower than the temperature at which the components of the aqueous composition may be destroyed. The temperature will be preferably between approximately 25° and approximately 50° C.

The term "microporous hydrophobic membrane" implies that the material contains pores which are not visibile to the naked eye but which are detectable with an optical microscope. A number of criteria can be adopted to choose this type of membrane. In fact, if the mean pore diameter is an essential parameter, the porosity per unit volume, that is to say the percentage of the volume of the pores in relation to the total volume of the material must also be taken into account. The mean pore diameter is advantageously between 0.02 $\mu$m and 5 $\mu$m. The porosity per unit volume will be preferably higher than 40%, advantageously higher than 80%.

Without being bound in any way whatsoever by a scientific interpretation, the Applicant thinks that the process according to the invention functions via osmotic evaporation. In fact, the hydrophobic nature of the membrane makes it impervious to water in liquid form and, consequently, impervious to nonvolatile aqueous solutes (especially ions and organic molecules). The passage of the water therefore probably takes place in vapor form, by simple gas diffusion in the micropores of the membrane.

As a general rule, hydrophobic membranes are made of polymeric materials which essentially do not include hydrophilic groups in their network. They therefore essentially consist of polymers obtained from hydrocarbons, such as polyolefins. Among these polyolefins there will be advantageously mentioned polyethylenes, polypropylenes, polyisopropylenes, polyvinylidenes or a mixture of these various polymers. These polyolefins may be optionally fluorinated, such as polytetrafluoroethylenes or polyfluorovinylidenes. Nevertheless, it is an essential feature of the present invention that the membrane is hydrophobic in character. These membranes are usually presented in planar or hollow fiber form.

The invention also relates to a process for at least partial continuous dehydration of a liquid or gaseous aqueous composition, in which a stream of said aqueous composition is brought into contact with a receiving phase through the intermediacy of a membrane as defined above. In this case, as will be understood in the light of the description below relating to the devices for implementing the process, the membrane is preferably in the form of hollow fibers.

The receiving phase may be stationary or, when liquid, advantageously mobile. In this latter case this receiving phase may circulate concurrently with or countercurrentwise to the aqueous composition.

The ratio of the initial volume of the aqueous composition to the developed surface of the membrane must be advantageously lower than 25 cm$^3$/cm$^2$ and preferably between 0.25 and 2.5 cm$^3$/cm$^2$.

The tangential speed at which the aqueous composition flows over the membrane must be advantageously higher than 1 cm/s and preferably between 10 and 100 cm/s.

The invention also relates to a device for implementing the process according to the invention which has just been described, said device being such that it comprises one or more compartments in which the aqueous composition is placed, at least one wall of said compartments being formed by a membrane as defined above, this membrane separating the composition from a receiving phase as described above.

According to a first alternate form, the device consists of a solid aqueous composition (for example fruit cut into strips) wrapped in a membrane and immersed in a receiving phase in accordance with the present invention.

According to a preferred alternate form enabling a process to be implemented continuously, the invention relates to a device in which the microporous hydrophobic membrane is made up of hollow fibers inside which flows the aqueous composition to be dehydrated, liquid or gaseous, introduced into the fibers by an entry and recovered at least partially dehydrated by an exit, said fibers being immersed in the receiving phase as defined above. The receiving phase may be stationary or, when liquid, advantageously mobile around the hollow fibers.

The fibers preferably have an internal diameter of between 0.1 and 10 mm.

DETAILED DESCRIPTION OF THE INVENTION

The invention will now be described by starting from concrete examples of the embodiment and especially by starting from two devices which enable the dehydration process to be implemented.

These devices will be described in connection with FIGS. 1, 2 and 3, attached to the present description.

Figure 1:
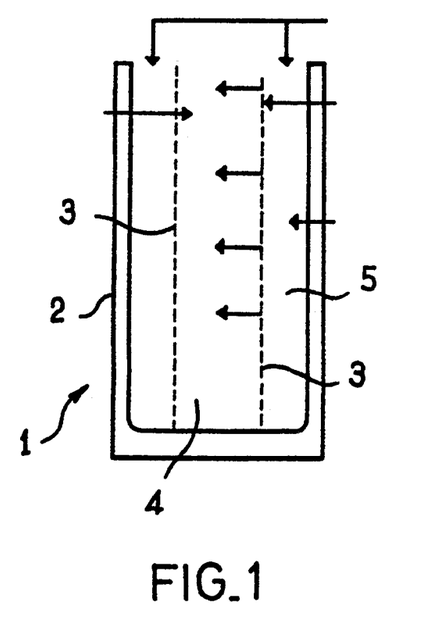
FIG. 1 shows a lengthwise sectional view of the first of two devices which enable the dehydration process according to the present invention to be implemented.

FIG. 1 shows a lengthwise sectional view of the first device.

Figure 2:
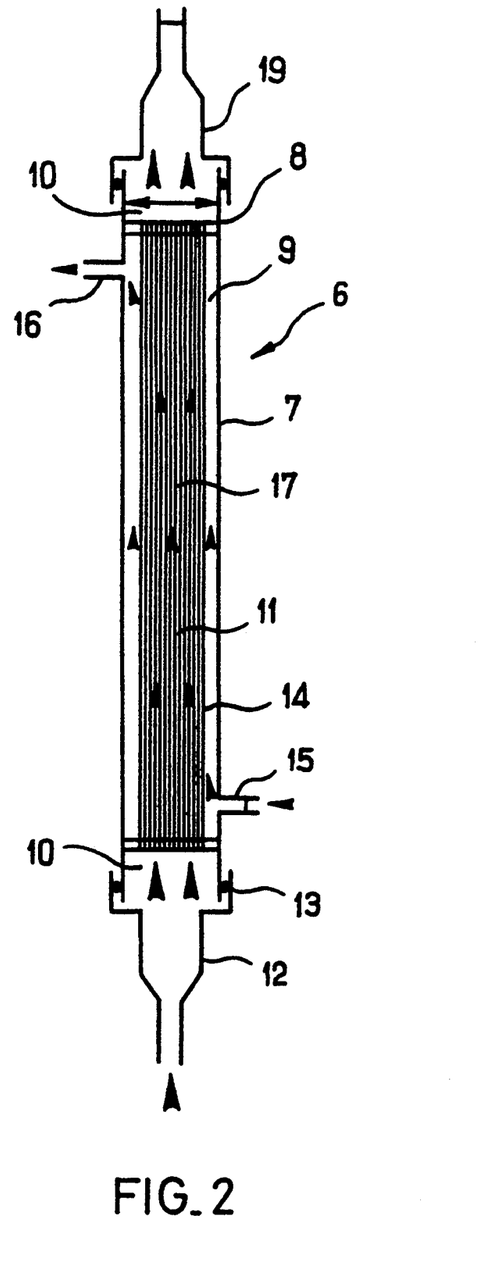
FIG. 2 shows a lengthwise sectional view of a second device enabling a continuous process to be implemented.

FIG. 2 shows a lengthwise sectional view of another device enabling the continuous process to be implemented.

Figure 3:
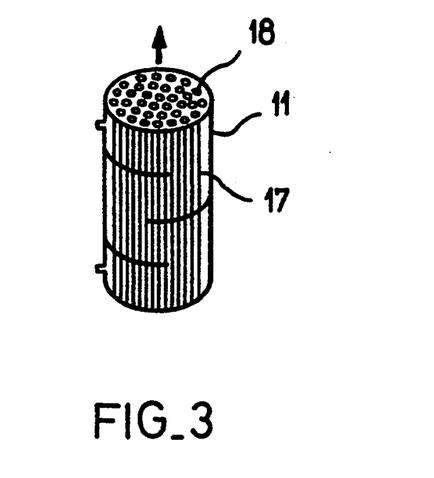
FIG. 3 shows a perspective view of the fiber module of the device of FIG. 2.

FIG. 3 shows a perspective view of the fiber module of the device of FIG. 2.

According to FIG. 1, the device 1 is a static concentrator, conventionally employed for concentrating solutes of molecular weight greater than 15,000. This concentrator comprises a Plexiglas storage vessel 2 of rectangular cross-section. Inside this storage vessel are placed, at equal distance from each other and in parallel, two membranes 3, bounding in a leakproof manner a central compartment 4 of 370 cm$^3$ where the water receiving phase is placed and two side compartments 5 in which aqueous solutions to be concentrated are placed. The leakproofing between, on the one hand, the Plexiglas half-cells and the hydrophobic membrane and, on the other hand, the two half-cells is produced by adhesive bonding.

According to FIGS. 2 and 3, the device 6 is made up of a tubular structure 7 closed near both its ends by two plugs 8 bounding, on the one hand, an internal tube 9 and in places of this internal tube, two tubular ends 10. A module of hollow fibers 11 is placed coaxially in the said internal tube. This module, consisting of a multiplicity of adjoining hollow fibers 17 is attached at its ends to plugs 8 so that the interior of the fibers 18 can communicate with the outer ends of the tubular structure by means of cavities arranged in the said plugs. The said tubular ends are connected in a leakproof manner to tubes 12, 19 by means of seals 13, one of the tubes making it possible to feed the fibers with aqueous, liquid or gaseous composition, and the other tube making it possible to recover the partially dehydrated composition. The space outside the fibers is filled with a liquid or solid receiving phase 14. This receiving phase is advantageously liquid and mobile and, in this case, the fibers are fed by means of an entry 15 situated at one of the ends of the internal tube, and are recovered at the other end via an exit 16.

The various feeds are ensured by circulating pumps connected to the corresponding storage vessels.

The feeding of this device is advantageously performed concurrently, so as to minimize the transmembrane pressure gradient at the ends of the fibers.

The examples below illustrate particular embodiments of the process according to the invention without, however, limiting the latter.

Tests in an Agitated Experimental Cell (not illustrated)

Each compartment of the cell has a volume of 12 cm$^3$ and the membrane separating said compartments has a working exchange area of 12 cm$^2$. Said compartments are filled completely (volumes of the aqueous phases equal 12 cm$^3$), one with an aqueous solution to be concentrated, the other with the receiving liquid phase, 6M CaCl$_2$, and the cell is then placed on an orbital agitation table in a thermostated enclosure.

The examples below were carried out with a 0.45-μ membrane (membrane No. 4 in the examples which are to follow), the characteristics of which are as follows:
porosity: 85%
tortuosity: 1.18
thickness (μm): 70
nature: polytetrafluoroethylene.

EXAMPLE 1

Three concentration tests were carried out with the same experimental cell on a solution of tryptophan (0.51 g/l) and monopotassium phosphate (7.5×10$^{-2}$M), water activity being approximately 0.99.

Figure 4:
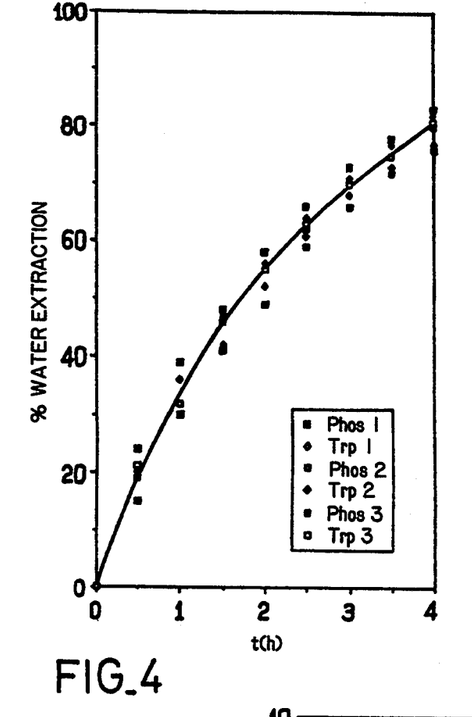
FIG. 4 shows the average kinetics of water extraction plotted against time.

No significant difference is observed between the various kinetics; FIG. 4 shows the average kinetics of water extraction measured from those measured for each test.

The speed of water transport slows down with time, especially because of the dilution of the receiving phase (and as a result of the increase in the water activity in this phase). The process is found to be highly efficient: 80% of water is, in fact, transported towards the receiving phase over 4 hours, the initial volume/exchange area ratio being equal to 1 cm.

Furthermore, the selectivity of the water transport should be noted. No trace of tryptophan or of phosphate is detected in the receiving phase (concentrations lower than 4×10$^{-4}$ g/l and 5×10$^{-5}$M respectively). The hydrophobic membrane also remains completely impervious to chloride ions (concentration in the phase to be concentrated lower than 10$^{-3}$M).

The following example is intended to illustrate the invention for different types of membranes and for a given solution of tryptophan and monopotassium phosphate. The tests are carried out under the same conditions as Example 1.

EXAMPLE 2

The following hydrophobic substrates were employed:

TABLE I

| Reference | Nature | Mean pore diameter (μm) | Porosity per unit vol. (%) | Thickness (μm) |
|---|---|---|---|---|
| 1 | PVDF | 0.22 | 75 | 125 |
| 2 | PTFE + PE | 0.5 | 85 | 60 +115 |
| 3 | PP | 0.04 | 45 | 25 |
| 4 | PTFE | 0.45 | 85 | 70 |
| 5 | PTFE | 0.02 | 50 | 80 |
| 6 | PTFE + PES | 0.2 | 78 | 60 +340 |

PVDF: polyvinylidene fluoride
PTFE: polytetrafluoroethylene
PP: polypropylene
PE: polyethylene
PES: polyester
(+) denoting a weave using the material which follows.

The receiving phase consists of a 6M solution of CaCl$_2$.

The composition to be dehydrated is a solution of tryptophan (0.51 g/l) and of monopotassium phosphate (7.5×10$^{-2}$M), the activity of this solution being approximately 0.99.

Figure 5:
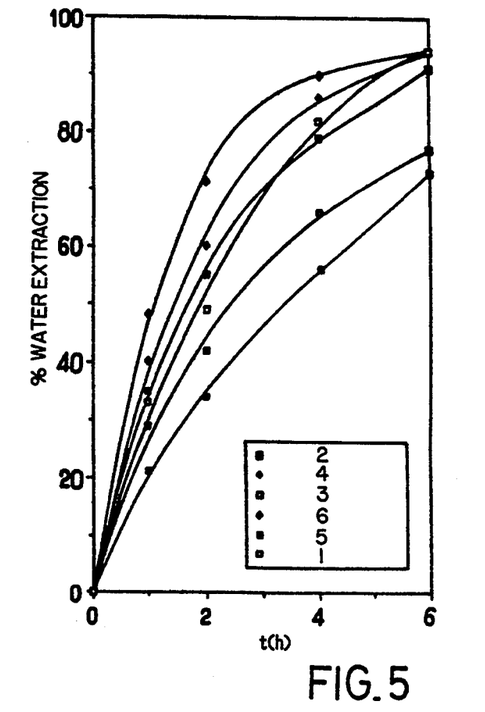
FIG. 5 shows water extraction kinetics through various tested membranes plotted against time.

The water extraction kinetics obtained by means of the process through the various tested membranes are shown in FIG. 5.

It is seen that the speed of transport depends on the hydrophobic substrate employed, as a result of the differences in geometrical characteristics. The fastest kinetics produce a water extraction percentage close to 95%.

Table II below shows the initial water flows, the order of magnitude of which is 10$^{-2}$ mol/h cm$^2$; the ratio of the flows obtained with the most efficient membrane (6) and with the substrate offering the highest resistance to the water transport (5) is only slightly greater than 2. Membrane (4) was adopted for the examples which follow.

TABLE II

| Substrate | Initial flow ($\times 10^{-3}$ mol/h cm$^2$) |
| --- | --- |
| 1 | 15.5 |
| 2 | 16.2 |
| 3 | 13.4 |
| 4 | 18.5 |
| 5 | 9.63 |
| 6 | 22.1 |

EXAMPLE 3

The test is performed under the same conditions as Example 2 with membrane 4 by varying the composition of the receiving phase. The aqueous composition is a solution of tryptophan (0.51 g/l) and of monopotassium phosphate ($7.5 \times 10^{-2}$M), the activity of this solution being approximately 0.99. The results are shown in Table III below:

TABLE III

| Composition of the receiving phase | | Water activity | Initial water flow ($10^{-3}$ mol/h cm$^2$) | % of water removed after four hours |
| --- | --- | --- | --- | --- |
| CaCl$_2$ | 1M | 0.94 | 1.75 | 10 |
| | 2M | 0.84 | 3.3 | 25 |
| | 4M | 0.54 | 7.7 | 50 |
| | 5M | 0.39 | 14.3 | 70 |
| | 6M | 0.25 | 18.2 | 80 |
| MgCl$_2$ | 4.5M | 0.45 | 13.3 | — |
| NaCl | 5.4M | 0.7 | 9.63 | — |

From these results it may be concluded that the speed and the maximum quantity of water extracted increase with the CaCl$_2$ concentration in the receiving phase or consequently decrease with the increase in the water activity. This trend has been verified with the other chloride salts; on the one hand, the initial water flow decreases linearly with the water activity in the receiving phase and, on the other hand, it is independent of the nature of the salt employed. The 6.0M CaCl$_2$ solution characterized by the lowest water activity (close to 0.25) was adopted for the example which follows:

Test by Means of the Device of FIG. 1

The example below was performed with the device of FIG. 1 with membrane 4, a tryptophan solution (0.51 g/l) and a receiving phase with a CaCl$_2$ concentration of 6M.

EXAMPLE 4

Figure 6:
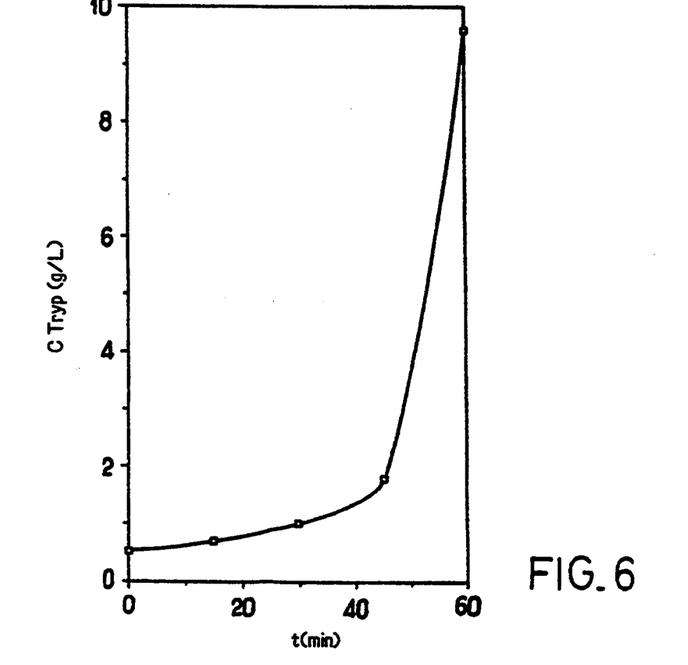
FIG. 6 shows the kinetics of concentration of a triptophan solution (0.51 g/l).
Figure 7:
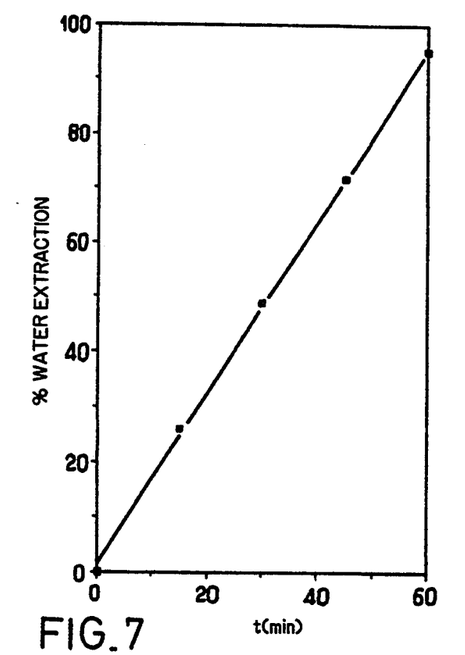
FIG. 7 shows the water extraction kinetics with the device of FIG. 1 with membrane 4, the triptophan solution in a receiving phase with a CaCl$_2$ concentration of 6M.

The results appear in FIG. 6, which shows the kinetics of concentration of the tryptophan solution, and in FIG. 7, which shows the water extraction kinetics.

It is seen that the tryptophan concentration increases in 1 hour of experiment from 0.5 to a value close to 10 g/l, which corresponds to a concentration factor of the order of 20. During the same period the percentage of water extraction from the solution increases linearly with time up to a value close to 95%.

EXAMPLE 5

Other solutions to be concentrated were tested under the same conditions.

Table IV below shows the main results obtained during the concentration of the seven solutions tested by means of the process.

After one hour's dehydration, the concentration factor of the solutions varies from 3.2 in the case of grape juice to 19 in the case of tryptophan solution, which corresponds to water extraction percentages equal to 68 and 95% respectively. The differences observed are linked with the initial values of the water activities of the solutions to be concentrated and consequently with their specific compositions and the concentrations of the solute(s) of which they consist.

The appearance of a precipitate, in equilibrium with the concentrated solution, is noted in some cases and at variable times. Solids content measurements have shown that the process can run until 83% of solids content is obtained (glucose solution at an initial concentration of 51 g/l) or until 75% of the solute has precipitated (kyotorphin solution, initially at 0.4 g/l).

TABLE IV

| Solute | Conc. factor in 1 h | % water extracted | Time to appearance of precipitate (min) | S.C. % | Precipitate % |
| --- | --- | --- | --- | --- | --- |
| Tryptophan | 19 | 95 | — | — | — |
| Kyotorphin | 8.5 | 88 | 65 | 45 | 75 |
| Glutamic acid | 6.8 | 85 | 65 | 55 | — |
| Glucose | 8.5 | 88 | 75 | 83 | — |
| Vitamin B$_{12}$ | 11 | 91 | 75 | 28 | 34 |
| α-Amylase | 13 | 92 | — | — | — |
| Grape juice | 3.2 | 68 | 90 | 70 | — |

Test by Means of Hollow Fiber Devices

The example below was performed with the device according to FIG. 2 with two different hollow fiber modules:

TABLE V

| | Reference module | 1 | 2 |
| --- | --- | --- | --- |
| Fiber characteristics | Nature | PVDF | polypropylene |
| | Internal φ (μm) | 900 | 1800 |
| | Thickness (μm) | 200 | 400 |
| | Number | 400 | 40 |
| | Length (cm) | 60 | 50 |
| | Mean pore φ (μm) | 0.1 | 0.2 |
| | Porosity/unit vol. (%) | 50 | 75 |
| Module characteristics | Total length (cm) | 85 | 60 |
| | Diameter (mm) | 50 | 20 |
| | Phase to be purified entry φ (mm) | 12 | 12 |
| | Receiving phase entry φ (mm) | 8 | 10 |
| | Membrane area (m$^2$) | 0.6 | 0.1 |

Figure 8:
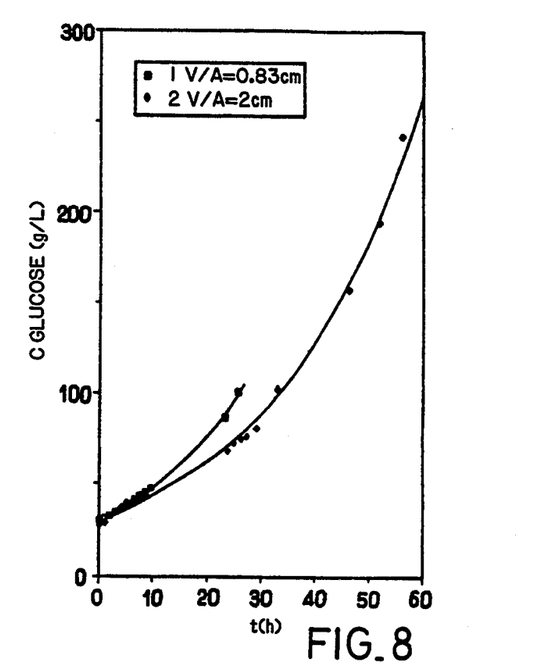
FIGS. 8 and 9 show the kinetics of concentration of glucose and the kinetics of water extraction respectively, plotted against time.
Figure 9:
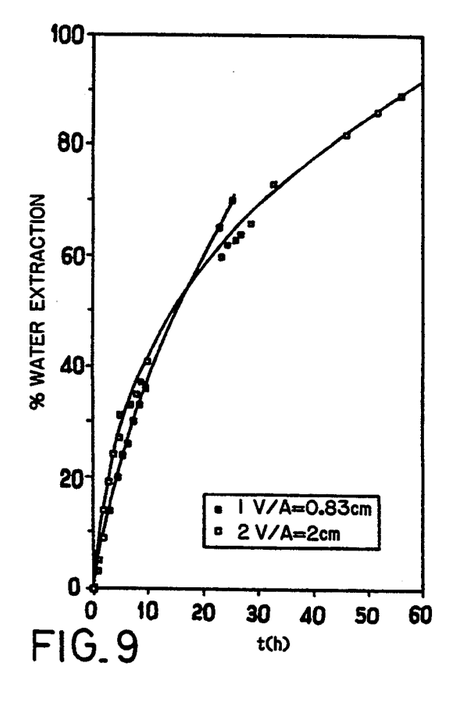

A glucose solution containing 30 g/l was concentrated through hollow fibers in these two modules of large exchange area (greater than or equal to 0.1 m$^2$). The main objective of these experiments is to demonstrate the industrial feasibility of the process. The flow rates of the phases to be concentrated and water receiver (6M CaCl$_2$) were set at 130 l/h and 30 l/h respectively. FIGS. 8 and 9 and Table VI show the kinetics of concentration of glucose, the kinetics of water extraction, the initial conditions and the measured initial water flows, respectively.

A glucose concentration factor higher than 8 and a water extraction close to 90% are observed over 2.5 days of handling.

The kinetics of glucose concentration and of water extraction are closely related from one module to the other, the initial volume/exchange area ratio being favorable to system 1. This module is therefore less efficient than 2. This result is confirmed by the comparison of the initial water flows, the order of magnitude of which is $10^{-3}$ mol/h cm$^2$: the flow is more than three times greater in the case of module 2 than in the case of module 1.

TABLE VI

Experimental conditions and module performance

| Module | Initial volume of phase to be concentrated (1) | Initial volume of receiving phase (1) | V/S | Initial flow ($\times 10^{-3}$ mol/h cm$^2$) |
|---|---|---|---|---|
| 1 | 5 | 2 | 0.83 | 2.0 |
| 2 | 2 | 0.5 | 2 | 6.4 |

Dehydration of a Solid Food Product (Elstar Apple)

EXAMPLE 7

The following example reports the dehydration of a solid food product by means of the process. Elstar apples cut into pieces are wrapped in a membrane of type 4.

Figure 10:
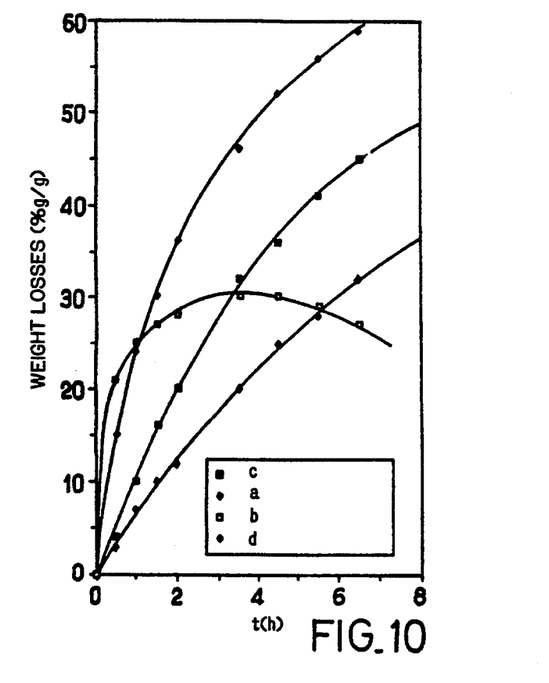
FIG. 10 shows the kinetics of losses in weight of apple pieces subjected to the different processes according to the present invention.

For the purpose of comparing different processes of dehydration of a solid foodstuff, the dehydration according to the invention (a) was conducted in parallel with an osmotic dehydration (b), a conventional evaporation (c) and an evaporation performed through a hydrophobic membrane (d). The kinetics of losses in weight of apple pieces subjected to the different processes are shown in FIG. 10.

It should be noted that the largest initial weight losses are obtained by osmotic dehydration, with or without any membrane; in the case of conventional osmotic dehydration it is noted, however, that the loss in weight decreases rapidly during the first four hours, becomes zero and subsequently leads to a slow weight gain.

Table VII shows the initial rates of loss in weight and the weight percentages lost after six hours' operation of the different processes. It is important to note that the process according to the invention is 2.5 times faster than conventional evaporation. Furthermore, within the scope of the conventional evaporation, wrapping the foodstuff in the hydrophobic membrane reduces the initial water flow by 30%, in agreement with the porosity indicated by the manufacturer.

The least efficient process is the conventional osmotic dehydration. The dehydration according to the process, resulting in a weight loss of 60% in 6 hours is, on the other hand, the most efficient process.

TABLE VII

Comparison of various processes for dehydration of solid foodstuffs

| Process | Initial rate of loss in weight (g g/h) | % weight lost after 6 hours |
|---|---|---|
| Evaporation | 0.10 | 45 |
| Evaporation + membrane | 0.07 | 32 |
| Osmotic dehydration | 0.24 | 26 |
| Osmotic dehydration + | 0.25 | 60 |

TABLE VII-continued

Comparison of various processes for dehydration of solid foodstuffs

| Process | Initial rate of loss in weight (g g/h) | % weight lost after 6 hours |
|---|---|---|
| membrane | | |

What is claimed is:

1. A process for at least partial dehydration of an aqueous composition, in which said composition to be dehydrated is brought into contact, through the intermediacy of a microporous hydrophobic membrane, with a liquid receiving phase comprising an aqueous solution of at least one solute so as to enable its water activity to be lower than approximately 0.6 and in which the aqueous composition, at least partially dehydrated, is recovered.

2. The process as claimed in claim 1, wherein the membrane has a porosity per unit volume greater than 40% and wherein the mean pore size is between 0.02 and 5 μm.

3. The process as claimed in claim 1, wherein the membrane is made predominantly of an optionally fluorinated polyolefin polymer.

4. The process as claimed in claim 1, wherein the solute is CaCl$_2$.

5. The process as claimed in claim 4, wherein the aqueous composition is liquid and the receiving phase additionally comprises one or a number of volatile constituents present in the aqueous composition, preferably at a concentration substantially equal to that existing in said aqueous composition.

6. The process as claimed in claim 5, wherein the receiving phase has a composition substantially identical with that forming said liquid aqueous composition and additionally comprises the solute(s) enabling the water activity to be lowered.

7. The process as claimed in claim 4, wherein the solute is preferably at least CaCl$_2$ 5M.

8. The process as claimed in claim 1, wherein the aqueous composition initially exhibits a water activity approximately greater than 0.9.

9. The process as claimed in claim 8, wherein said aqueous composition is a solution of biological compounds selected from a group consisting of fruit juices, vegetables or chopped fruit.

10. A continuous process for at least partial dehydration of a liquid or gaseous aqueous composition as claimed in claim 1, wherein a stream of said liquid or gaseous aqueous composition to be dehydrated is brought into contact with a receiving phase, stationary or mobile, through the intermediacy of a hydrophobic membrane.

11. The process as claimed in claim 1, wherein the water activity of said liquid receiving phase is lower than approximately 0.4.

12. The process as claimed in claim 1, wherein the water activity of said liquid receiving phase is lower than approximately 0.3.

13. The process as claimed in claim 1, wherein said aqueous solution is one of CaCl$_2$ and MgCl$_2$.

* * * * *

UNITED STATES PATENT AND TRADEMARK OFFICE
CERTIFICATE OF CORRECTION

PATENT NO. : 5,382,365
DATED : January 17, 1995
INVENTOR(S) : Deblay It is certified that error appears in the above-identified patent and that said Letters Patent is hereby corrected as shown below:

In column 2 at line 68 delete "Just" insert --just--;

In column 3 at line 42 delete "Juices" insert --juices--;

In column 8 at line 51 delete "(7.5 X $10^{(2}M)$" insert --(7.5 X $10^{-2}M$)--.

Signed and Sealed this

Twenty-second Day of August, 1995

Attest:

BRUCE LEHMAN

*Attesting Officer*  *Commissioner of Patents and Trademarks*